(12) United States Patent
Peterson et al.

(10) Patent No.: US 8,770,055 B2
(45) Date of Patent: Jul. 8, 2014

(54) MULTI-AXIS PIVOT ASSEMBLY FOR CONTROL STICKS AND ASSOCIATED SYSTEMS AND METHODS

(75) Inventors: Terry Peterson, Eagle Rock, CA (US); David Daniel Drobnis, Mar Vista, CA (US)

(73) Assignee: Mason Electric Company, Sylmar, CA (US)

( * ) Notice: Subject to any disclaimer, the term of this patent is extended or adjusted under 35 U.S.C. 154(b) by 345 days.

(21) Appl. No.: 13/159,273

(22) Filed: Jun. 13, 2011

(65) Prior Publication Data

US 2011/0303038 A1    Dec. 15, 2011

Related U.S. Application Data

(60) Provisional application No. 61/354,179, filed on Jun. 11, 2010.

(51) Int. Cl.
*B60K 20/00*    (2006.01)

(52) U.S. Cl.
USPC .................................. 74/471 XY; 74/473.13

(58) Field of Classification Search
USPC ....................... 74/471 XY, 473.1, 469, 473.13
See application file for complete search history.

(56) References Cited

U.S. PATENT DOCUMENTS

| | | | |
|---|---|---|---|
| 3,011,739 A | 12/1961 | Boyce et al. | |
| 3,028,126 A | 4/1962 | Holleman | |
| 4,012,014 A | 3/1977 | Marshall | |
| 4,947,701 A | 8/1990 | Hegg | |
| 4,962,448 A | 10/1990 | DeMaio et al. | |
| 5,142,931 A | 9/1992 | Menahem | |
| 5,149,023 A * | 9/1992 | Sakurai et al. | 244/229 |
| 5,619,195 A | 4/1997 | Allen et al. | |
| 5,721,566 A * | 2/1998 | Rosenberg et al. | 345/161 |
| 5,854,622 A | 12/1998 | Brannon | |
| 6,486,872 B2 * | 11/2002 | Rosenberg et al. | 345/161 |
| 8,074,941 B2 * | 12/2011 | Daunois et al. | 244/237 |
| 8,100,029 B2 | 1/2012 | Peterson et al. | |
| 2008/0190233 A1 | 8/2008 | Peterson et al. | |
| 2010/0011897 A1 * | 1/2010 | Kopp | 74/471 XY |
| 2010/0133454 A1 * | 6/2010 | Strange et al. | 251/129.01 |
| 2011/0296941 A1 * | 12/2011 | Kopp | 74/471 XY |
| 2011/0303039 A1 * | 12/2011 | Kopp | 74/471 XY |

FOREIGN PATENT DOCUMENTS

| | | |
|---|---|---|
| EP | 0363739 | 4/1990 |
| EP | 0525689 | 2/1993 |
| WO | WO93/18475 | 9/1993 |
| WO | WO2008/100870 | 8/2008 |

* cited by examiner

*Primary Examiner* — David M Fenstermacher
(74) *Attorney, Agent, or Firm* — Perkins Coie LLP

(57) ABSTRACT

Multi-axis pivot assemblies for control sticks and associated systems and methods are disclosed herein. A multi-axis pivot assembly in accordance with an embodiment of the present technology can include, for example, an input shaft, a first axis output shaft coupled to the input shaft, and a second axis output shaft coupled to the input shaft via a series of linkages and pivoting joints. The first and second axis output shafts rotated about corresponding first and second fixed bearing sets to capture a first axis output and a second axis output. The series of linkages are configured to decouple first axis movement of the input shaft from second axis movement of the input shaft such that the second axis output is substantially independent of the first axis output.

19 Claims, 16 Drawing Sheets

US 8,770,055 B2

MULTI-AXIS PIVOT ASSEMBLY FOR CONTROL STICKS AND ASSOCIATED SYSTEMS AND METHODS

CROSS-REFERENCE TO RELATED APPLICATION(S)

This application claims the benefit of pending U.S. Provisional Application No. 61/354,179, entitled "MULTI-AXIS PIVOT MECHANISM FOR SIDE STICK CONTROLLER," filed Jun. 11, 2010, and incorporated herein by reference in its entirety.

TECHNICAL FIELD

The present technology relates to control sticks, and in particular, to control sticks including multi-axis pivot assemblies.

BACKGROUND

Aircraft, such as high-speed jets, and other vehicles include control sticks (e.g., side stick controllers, center stick controllers) that pivot about a base and translate the pivoting motion into corresponding outputs (e.g., angle, direction) that can be used to control the aircraft. For example, a typical aircraft control stick is moved fore and aft to command aircraft pitch and side to command aircraft roll.

Control sticks typically include a grip that an operator grasps when making input commands or control inputs. The control stick is generally coupled to the aircraft or other device at one or more pivot points below the grip. For example, an aircraft control stick can be coupled to a pivot point that picks up pitch inputs and a pivot point that picks up roll inputs. Conventional control sticks use a gimbal assembly with one or more sliding input elements, such as sensors, to translate the inputs received from the operator into corresponding outputs. Sliding input elements, however, require clearance between the sliding surfaces and are susceptible to introducing backlash into the system. Backlash can result in reduced sensitivities of the system and reduced accuracy (i.e., larger tolerances) in the output that may not be suitable for control sticks with tight angle output tolerances.

DETAILED DESCRIPTION

The present technology is directed toward multi-axis pivot assemblies for control sticks and associated systems and methods. In several embodiments, for example, a multi-axis pivot assembly can include an input shaft coupled to a Y axis output shaft and an X axis output shaft via a series of linkages on pivoting joints. The multi-pivot assembly is coupled together with pivoting joints that can capture a Y axis output via the Y axis output shaft and an X axis output via the X axis output shaft with substantially no backlash. Certain specific details are set forth in the following description and in FIGS. 1A-6C to provide a thorough understanding of various embodiments of the technology. For example, several embodiments of multi-axis pivot assemblies for use with aircraft control sticks are described in detail below. The present technology, however, may be used to control other devices and systems, such as cranes, trucks, watercraft, wheelchairs, surveillance cameras, remotely-controlled devices, such as robots, drones, etc. A person of ordinary skill in the art, therefore, will accordingly understand that the technology may have other embodiments with additional elements, or the technology may have other embodiments without several of the features shown and described below with reference to FIGS. 1A-6C.

Many of the details, dimensions, angles, relative sizes of components, and/or other features shown in FIGS. 1A-6C are merely illustrative of particular embodiments of the disclosure. Accordingly, other embodiments can have other details, dimensions, angles, sizes, and/or features without departing from the spirit and scope of the present technology. Other details describing well-known structures and components often associated with gimbals and control sticks, however, are not set forth below to avoid unnecessarily obscuring the description of various embodiments of the present technology. Moreover, one of ordinary skill in the art will appreciate that any relative positional terms such as fore, aft, left, right, above, below, over, under, etc. do not necessarily require a specific orientation of the multi-axis pivot assemblies and control stick systems as described herein. Rather, these or similar terms are intended to describe the relative position of various features of the disclosure described herein.

Figure 1A:
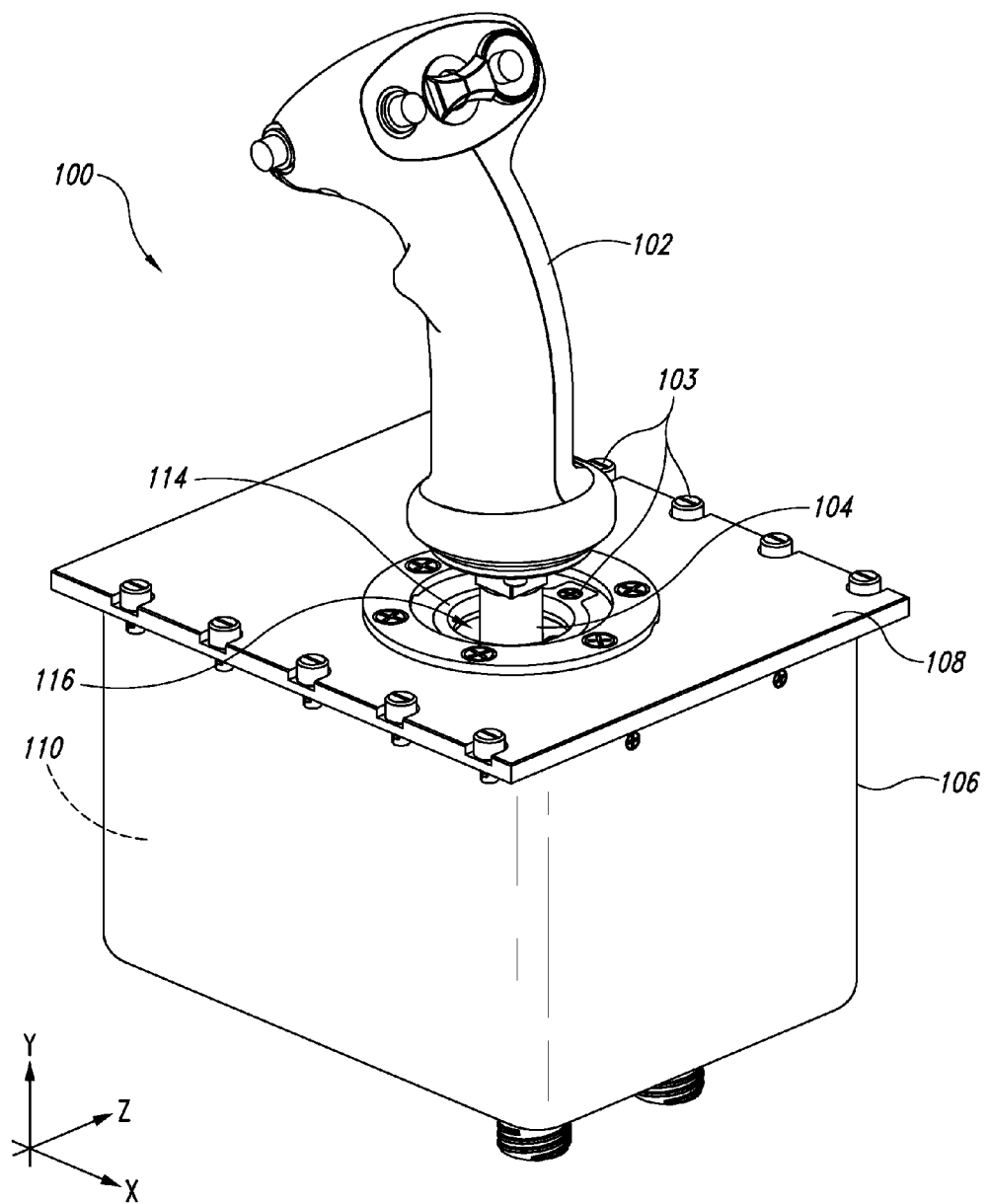
FIGS. 1A and 1B are isometric views of a control stick system configured in accordance with an embodiment of the present technology.
Figure 1B:
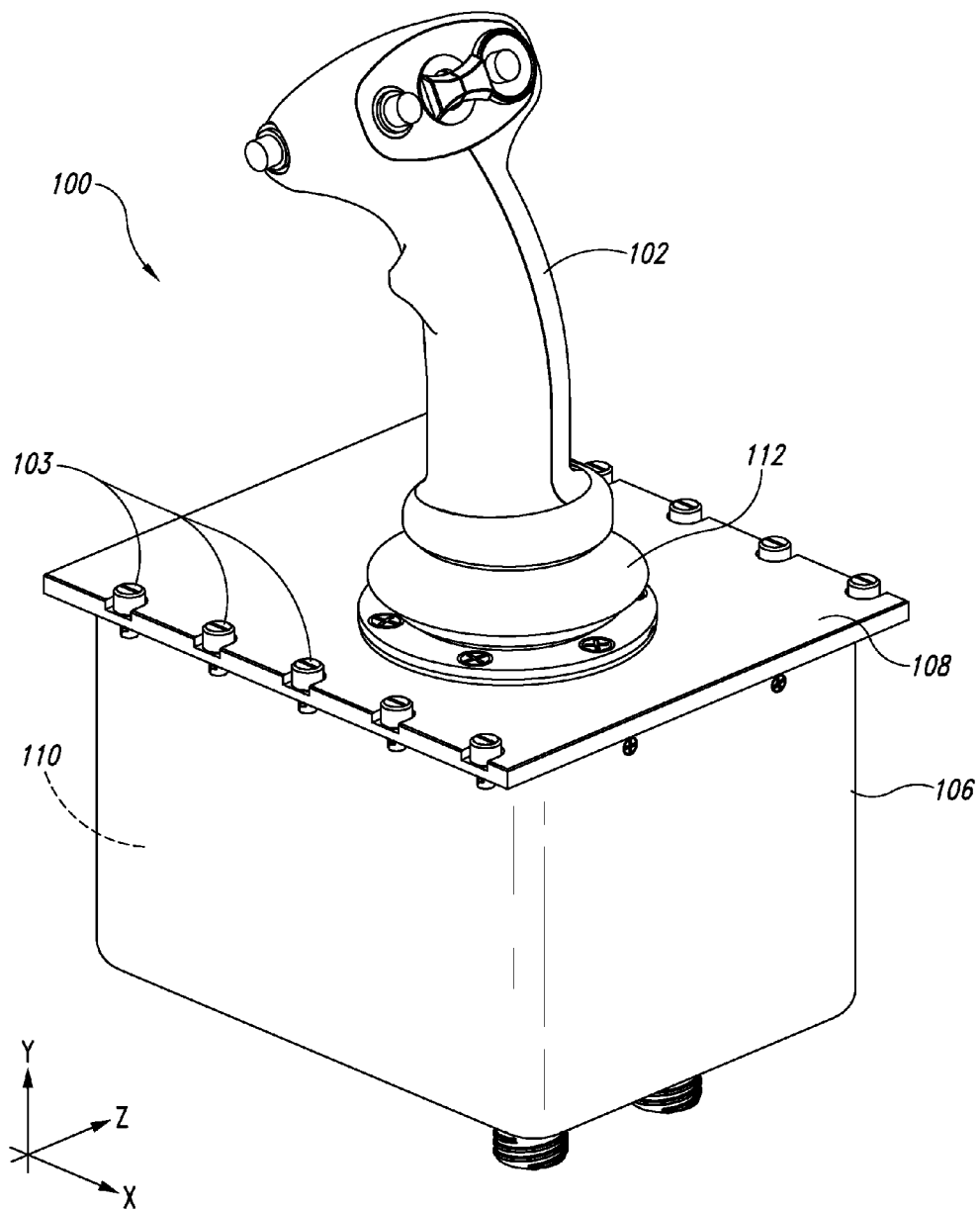

FIGS. 1A and 1B are isometric views of a control stick system 100 configured in accordance with an embodiment of the present technology. Referring to FIG. 1A, the control stick system 100 can include a grip 102 coupled to an input shaft 104 that extends through a stop ring 114 and couples to the multi-axis pivot assembly 110 ("pivot assembly 110") stored within a housing 106. The grip 102 can pivot over a top plate 108 of the housing 106 to control a device coupled thereto. In the illustrated embodiment, the control stick system 100 is configured to be a control stick in an aerospace vehicle (e.g., a plane, jet, helicopter, etc.). However, as will be appreciated by one of ordinary skill in the art, the control stick system 100 can be configured as a side stick controller, a center stick controller, and/or other types of control sticks for other types of vehicles (e.g., watercraft, automobiles) and/or non-vehicle uses (e.g., cranes, robots).

The housing 106 encloses the pivot assembly 110 and associated mechanisms to reduce or prevent external debris and/or impacts from interfering with the workings of the pivot assembly 110. Accordingly, the housing 106 can be made from a durable material, such as a rigid plastic, metal, and/or other suitable materials. In other embodiments, the housing 106 can enclose only a portion of the pivot assembly 110, or the housing 106 can be omitted from the control stick system 100. The top plate 108 is coupled to the lower portion of the housing 106 using one or more screws 103 as shown in FIG. 1A and/or using other suitable fastening mechanisms.

The stop ring 114 is attached to the top plate 108 and/or other portion of the housing 106 using one or more screws 103, nails, adhesives, and/or other suitable fastening mechanisms. In other embodiments, the stop ring 114 can be integrally formed with the top plate 108. The stop ring 114 has an opening 116 that defines the limits to the range of motion of the input shaft 104. For example, as shown in FIG. 1A, the opening 116 of the stop ring 114 is substantially circular. In other embodiments, the opening 116 can be shaped like an oval, square, another quadrilateral, and/or other suitable shapes. The stop ring 114 is formed from a rigid material, such as metal or plastic, to withstand the load from the input shaft 104 as it pivots and drives against the stop ring 114.

As shown in FIG. 1B, the interface between the grip 102 and the housing 108 can be covered by a boot 112 that is configured to protect the mechanisms (e.g., the pivot assembly 110) stored within the housing 108. In the illustrated embodiment, the boot 112 has an accordion-like configuration to allow the grip 102 to pivot substantially freely about the top plate within the limitations defined by the stop ring 114. The boot 112 can accordingly be made from a deformable material that permits such free range of motion, such as an elastomeric material, a woven material, and/or other suitable materials. In other embodiments, the boot 112 can have other configurations that do not inhibit pivoting the grip 102 and the input shaft 104. In further embodiments, the boot 112 may be omitted.

In the illustrated embodiment, the control system 100 is configured to receive the input movement upon pivotal movement of the input shaft 104, and the input movement is defineable relative to two axes, namely the X and Y axes. For example, an operator can pivot the grip 102 fore and aft (i.e., along the Y axis) to control aircraft pitch, and can pivot the grip 102 left and right (i.e., along the X axis) to control aircraft roll. The input movement, of course, can be at any direction relative to the X and Y axes, and the movement is defineable relative to the X and Y axes. Although the control system 100 is described herein in connection with use of input movement relative to the X and Y axes, other embodiments are configured to use input movement relative to other combinations of axes, such as the X and Z axes or the Y and Z axes. In yet other embodiments, the control system 100 can be configured to use input movement relative the each of the X, Y and Z axes. The sensitivity of the inputs from the grip 102 and input shaft 104 to outputs of the control stick system 100 can be a function of the size and relative location of various portions of the pivot assembly 110 and/or the system that it controls.

Figure 2A:
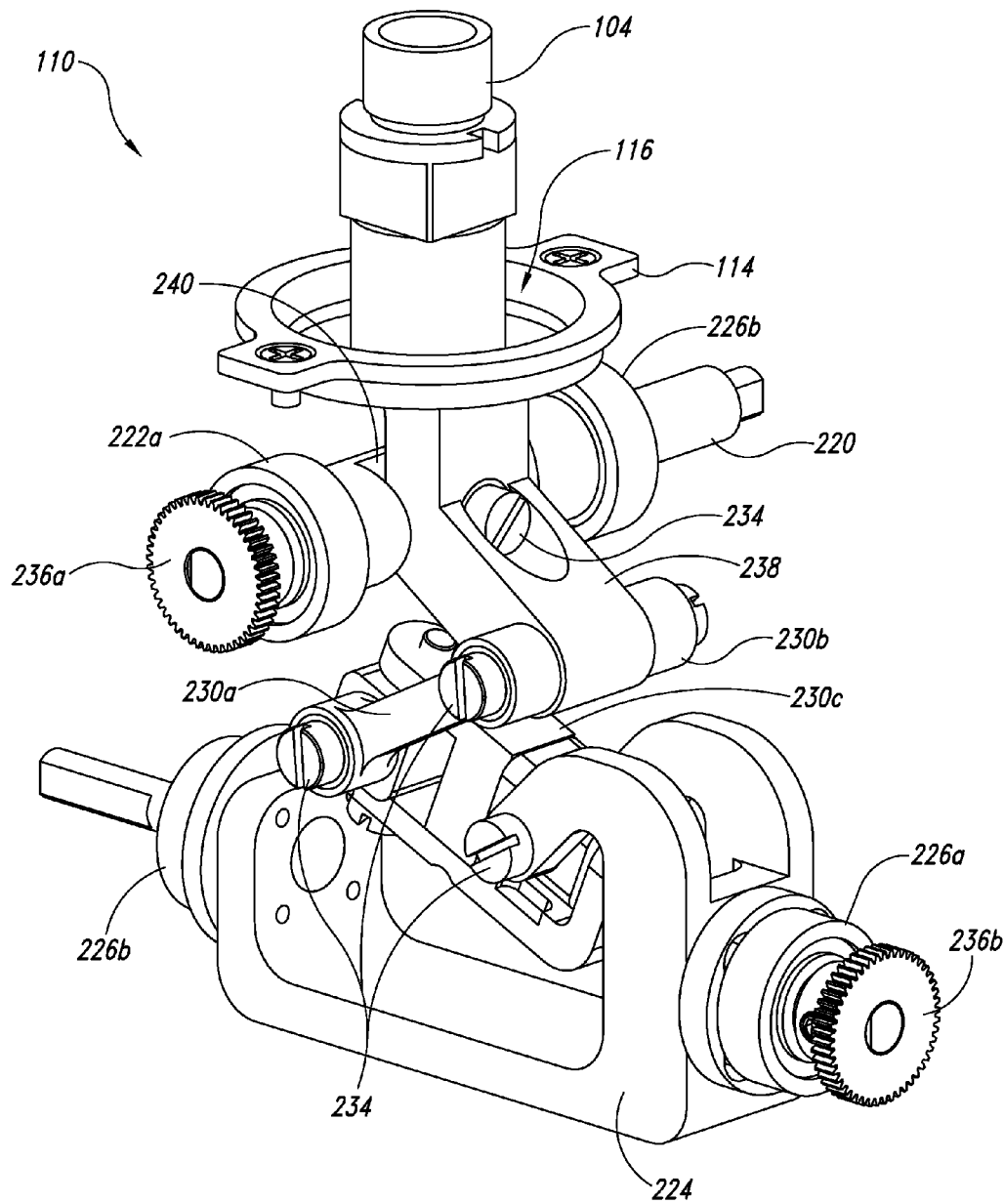
FIGS. 2A-2C are front isometric, back isometric, and side views, respectively, of a multi-axis pivot assembly in accordance with an embodiment of the present technology.
Figure 2B:
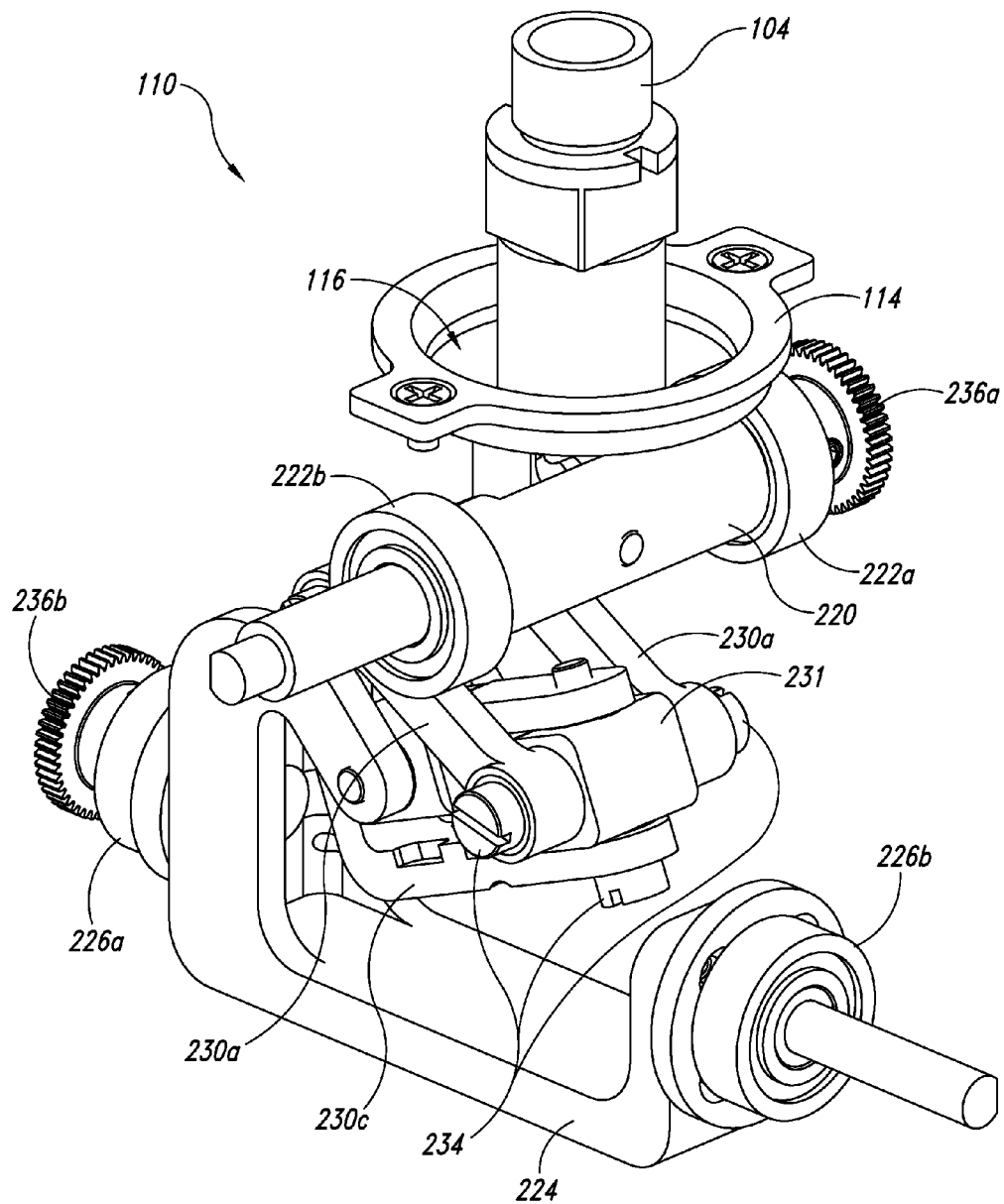
Figure 2C:
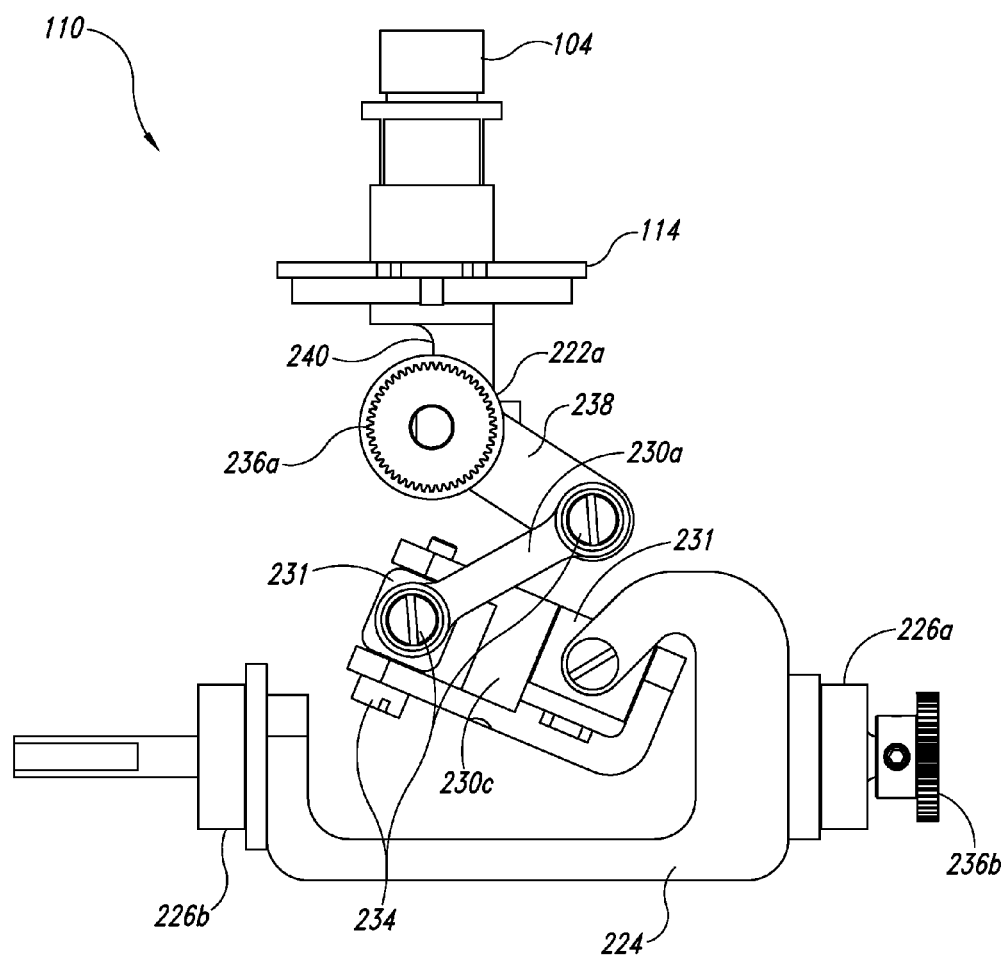

FIGS. 2A-2C are front isometric, back isometric, and side views, respectively illustrating the pivot assembly 110 (not visible in FIGS. 1A and 1B) in accordance with an embodiment of the present technology. Referring to FIGS. 2A-2C together, the pivot assembly 110 includes the input shaft 104, a Y axis output shaft 220 coupled to the input shaft 104, and an X axis output shaft 224 coupled to the input shaft 104 via a series of linkages 230 (identified individually as first-third linkages 230a-c, respectively). In the illustrated embodiment, the Y axis output shaft 220 is configured to rotate about a first bearing set 222 (identified individually as a first bearing 222a and a second bearing 222b) to capture a Y axis output when a component of the movement of the input shaft 104 is along a first axis (e.g., the Y axis, fore and aft). Similarly, the X axis output shaft 224 can be configured to rotate about a second bearing set 226 (identified individually as a third bearing 226a and a fourth bearing 226b) to capture an X axis output when a component of the movement of the input shaft 104 is along a second axis (e.g., the X axis, sideways left and/or right) orthogonal to the first axis.

The first and second bearing sets 222 and 226 of the illustrated embodiment are mounted in fixed positions relative to one another. For example, the first and second bearing sets 222 and 226 can be fixedly mounted to plates or brackets within the housing 106 (FIGS. 1A and 1B) and/or other suitable stationary structures. The first and second bearing sets 222 and 226 can be ball bearing assemblies. In other embodiments, the first and second bearing sets 222 and 226 can be journal bearings, fluid bearings, magnetic bearings, and/or other bearings or mechanisms that provide precise, constrained relative movement of the Y and X axis output shafts 220 and 224. In further embodiments, the Y and X axis output shafts 220 and 224 can each be coupled to more than two bearings.

In various aspects of the illustrated embodiment, the first and second bearing sets 222 and 226 are configured to substantially reduce or eliminate axial play and backlash (i.e., lost motion due to clearance or slackness when movement is reversed and contact is re-established) between the Y and X axis output shafts 220 and 224. For example, the inner surfaces of the first and second bearings 222a and 222b (i.e., the surfaces proximate to the Y axis output shaft 220) can be canted or otherwise biased toward one another, and the outer surfaces of the first and second bearings 222a and 222b (i.e., the surfaces radially outward from the inner surfaces) can be canted or otherwise biased away from one another. The second bearing set 226 can be similarly biased to reduce or eliminate the backlash in the X axis output shaft 224.

As shown in FIG. 2A, the Y axis output shaft 220 is coupled to a shaft grip 238 that extends from the input shaft 104. The shaft grip 238 can be fixedly attached to the input shaft 104 via suitable fastening mechanisms, or the shaft grip 238 can be integrally formed with the input shaft 104. As the input shaft 104 moves with motion that has a component along the first axis (i.e., fore and aft along the Y axis), the shaft grip 238 can press against the Y axis output shaft 220 to rotate it in a corresponding degree and direction. In the illustrated embodiment, the shaft grip 238 contacts a notched portion 240 of the Y axis output shaft 220 such that the shaft grip 230 can rotate and swing freely about a pivoting joint 234 (explained in further detail below) when the motion of the input shaft 104 has a component along the second axis (i.e., sideways along the X axis). In other embodiments, the shaft grip 238 is omitted such that the input shaft 104 itself rotates the Y axis output shaft 220.

In the illustrated embodiment, the X axis output shaft 224 grasps the third linkage 230c on both sides and curves around beneath it to accommodate the movement of the series of linkages 230. However, in other embodiments, the linkages 230 can be configured differently such that the X axis output shaft 224 can be substantially linear like the Y axis output shaft 220. In further embodiments, the Y axis output shaft 220 and/or the X axis output shaft 224 can have other suitable configurations.

The series of linkages 230 separates the X axis output shaft 224 from the Y axis output shaft 220 and decouples the X axis output from the Y. For example, referring to FIGS. 2A and 2B together, the first and second linkages 230a and 230b are coupled to either side of the shaft grip 238 and the third linkage 230c, and the third linkage 230c is coupled to the X axis output shaft 224. The third linkage 230c can be configured to twist between the other linkages 230 and the Y and X output shafts 220 and 224. In the embodiment illustrated in FIGS. 2A-2C, for example, the third linkage 230c pivots biaxially about two spider pivot bolts 231 (FIG. 2C). In other embodiments, the linkages 230 can include other features that provide a biaxial pivot.

The linkages 230 can be coupled together with pivoting joints 234 such that the linkages 230 rotate with respect to one another and with respect to the Y and X axis output shafts 220 and 224. Each of the pivoting joints 234 can include shoulder screws rotatably coupled to corresponding bearing sets (e.g., similar to the first and second bearing sets 222 and 226) that allow the linkages 230 and the Y and X axis output shafts 220 and 224 to rotate with respect to one another. Similar to the first and second bearing sets 222 and 226 described above, each of the bearing sets of the pivoting joints 234 can be preloaded and set to a final torque to substantially remove axial play and backlash from each of the pivoting joints 234. In selected embodiments, the bearing sets are what are known in the art as "permanently lubricated" ball bearings that provide for smooth, low-friction operation. In other embodiments, the pivoting joints 234 can include other bearings and/or other pivoting features, such as ball-and-socket joints.

As further shown in FIGS. 2A-2C, the pivot assembly 110 can also include interface members, such as a first gear 236a coupled to the Y axis output shaft 220 and a second gear 236b can be coupled to the X axis output shaft 224. The first and second gears 236a and 236b can be configured to drive angular position sensors (not shown) that read the corresponding X and Y axis outputs. For example, the gears 236 can drive rotary variable differential transforms ("RVDTs") that have a range of plus or minus approximately 20°, plus or minus approximately 60°, and/or other suitable ranges. In other embodiments, the first and second gears 236a and 236b can be configured to drive motors to positions corresponding to the X and Y axis outputs and/or drive other suitable devices with the X and Y outputs. The Y and X axis outputs to the sensors, motors, or other suitable devices can be driven off one side of the Y and X axis output shafts 220 and 224 and the spring force return can be driven off the opposite side, thereby providing two separate load paths.

The Y axis output shaft 220 and the X axis output shaft 224 can be substantially equal in length. The first and second bearing sets 222 and 226 fix the Y and X output shafts 220 and 224 in position relative to one another regardless of the movement of the intervening linkages 230 to form a theoretical parallelogram. This allows the X axis output to be delivered at a position offset from (e.g., below) the Y axis output shaft 220, the intervening linkages 230 to decouple the X axis output from the Y axis output such that they are independent of one another. In the illustrated embodiment, the Y axis output shaft 220 and the X axis output shaft 224 define planes spaced apart from each other that are substantially parallel to one another, while the X axis and the Y axis are orthogonal to each other. In other embodiments, the Y and X output shafts 220 and 224 can be oriented so as to define planes at different angles from one another.

Unlike conventional gimbals that include sliding joints, the pivot assembly 110 precisely transfers the movement from the input shaft 104 to the Y and X axis output shafts 220 and 226 via pivotal movement with pivoting joints 234. The pivoting joints do not require clearance necessary from sliding joints, and therefore do not necessarily introduce backlash into the pivot assembly 110. While the first and second bearing sets 222 and 226 can be preloaded and set to a final torque to substantially remove or eliminate axial play and backlash in the pivot assembly 110 while still allowing smooth and precise rotational movement. For example, the pivot assembly 110 can be configured to have approximately one degree of movement in the X axis output shaft 224 when it is positioned approximately six to seven inches from the input pivot point (e.g., the pivot point of the input shaft 104). This translates into a mere ¹²⁄₁₀₀₀" of movement. In other embodiments, the pivot assembly 110 can have more or less permitted movement depending upon the size and configuration of the pivot assembly 100 and on other characteristics of the system to which the pivot assembly 110 is coupled. Accordingly, the pivot assembly 110 can accommodate applications that require tight angle tolerances, such as military jets, where backlash, even relatively small amounts, can have detrimental effects. Additionally, the pivot assembly 110 of the illustrated embodiment can have a smaller footprint than conventional gimbals because the pivoting joints 234 do not require the clearance and associated space necessary for sliding joints.

In the illustrated embodiment the pivot assembly receives input via the input shaft and provides precise output via the X and Y axis output shafts. In other embodiments, the pivot assembly 110 can be used in the opposite direction, wherein the Y axis "output" shaft 220 is configured to receive a first input, such as a Y axis input, and the X axis "output" shaft 224 is configured to receive a second input, such as an X axis input. These inputs are precisely and accurately translated via the pivot assembly to controlled movement of the "input" shaft 104, which of course would effectively be an output shaft. For example, a system (e.g., a controller) can be configured to deliver Y and X axis inputs to the Y and X axis output shafts 220 and 224, and the input shaft 104 (now functioning as an output shaft) can pivot to the corresponding position. The reversed pivot assembly 110 can be coupled to robotic arms and/or other output devices during robotic, computer-assisted, and robot-assisted actions to achieve specific positions with reduced backlash induced error.

Figure 3A:
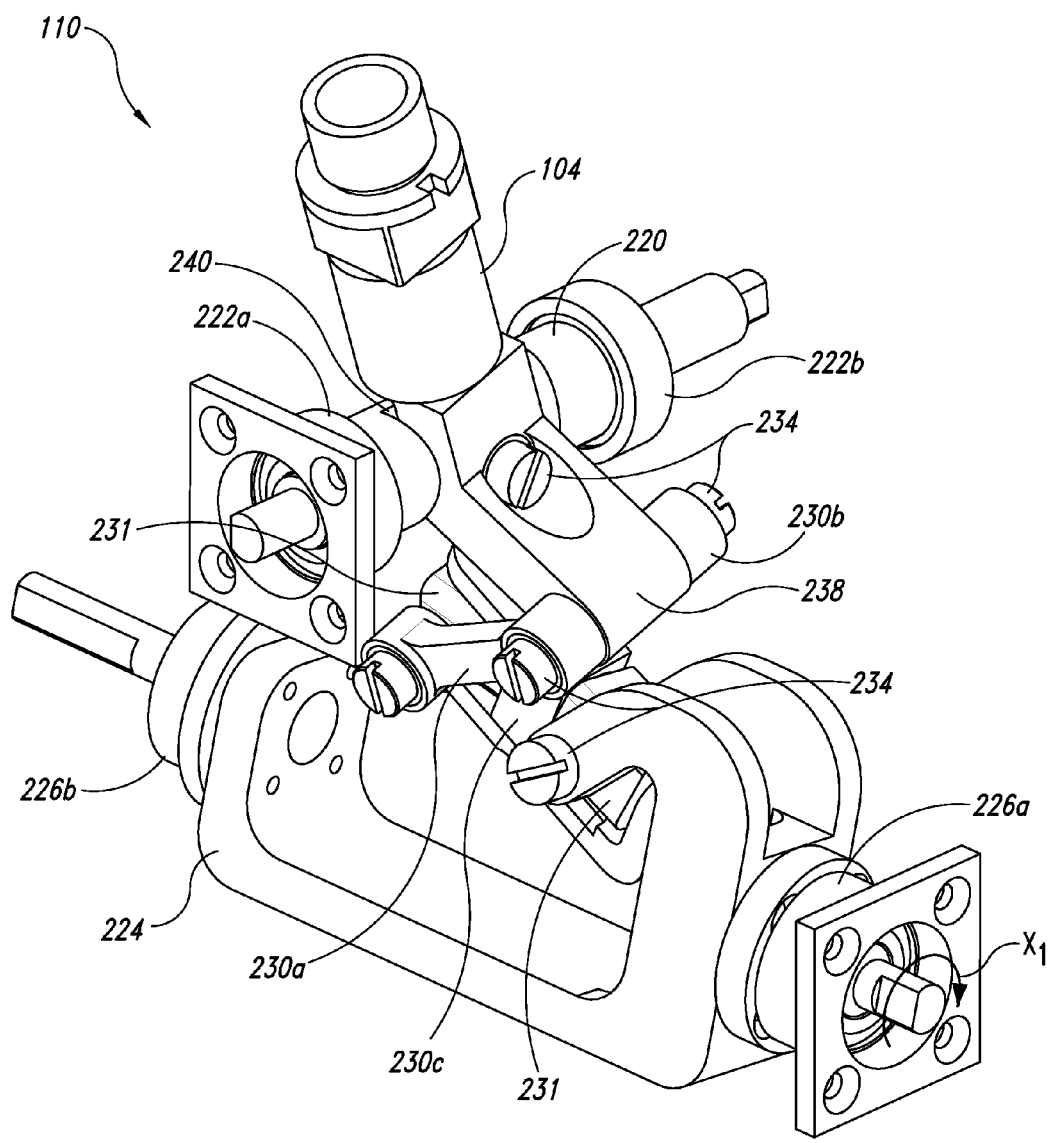
FIGS. 3A-3C are side isometric views illustrating various orientations of the multi-axis pivot assembly of FIGS. 2A-2C corresponding to control inputs in accordance with an embodiment of the present technology.
Figure 3B:
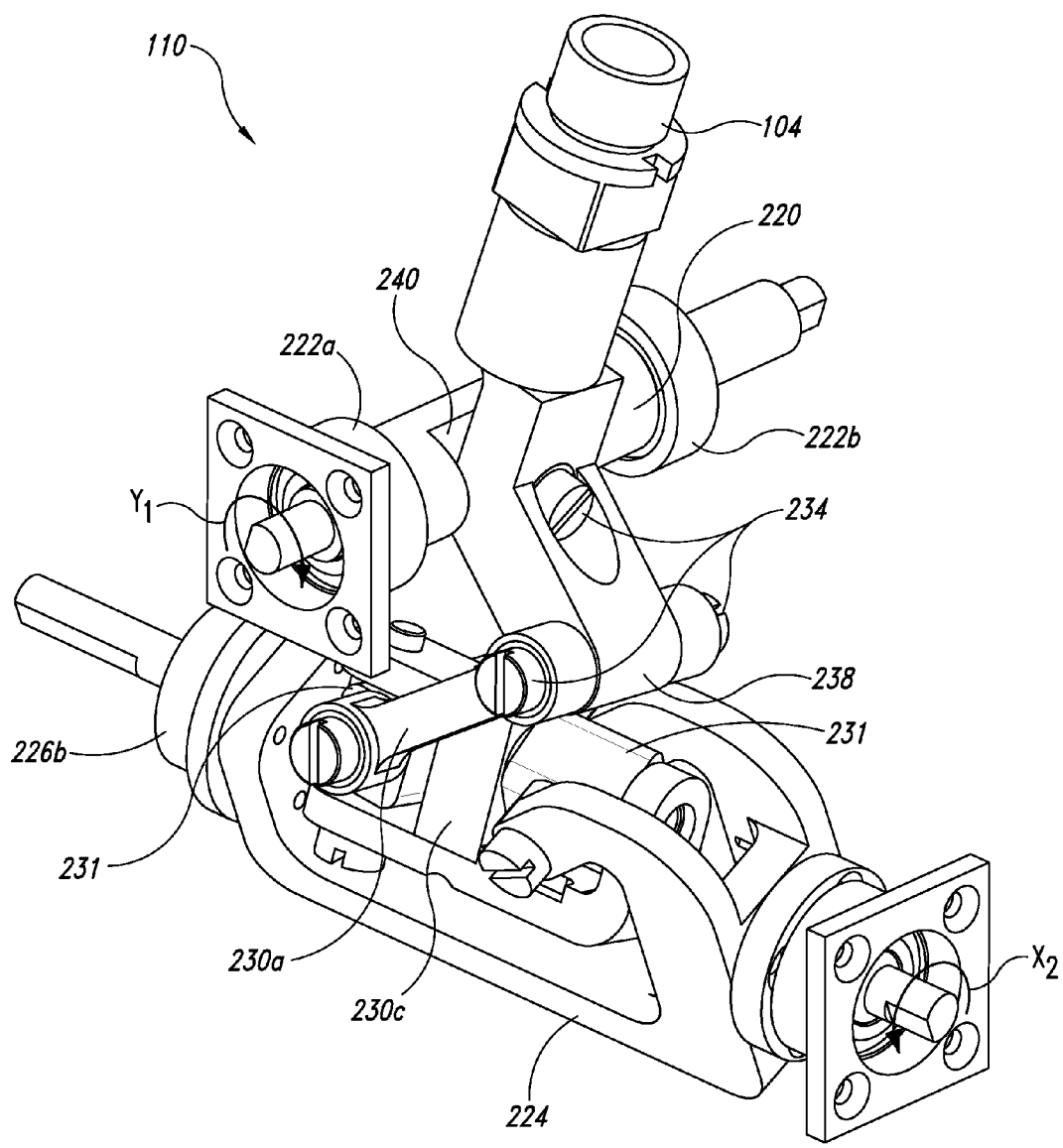
Figure 3C:
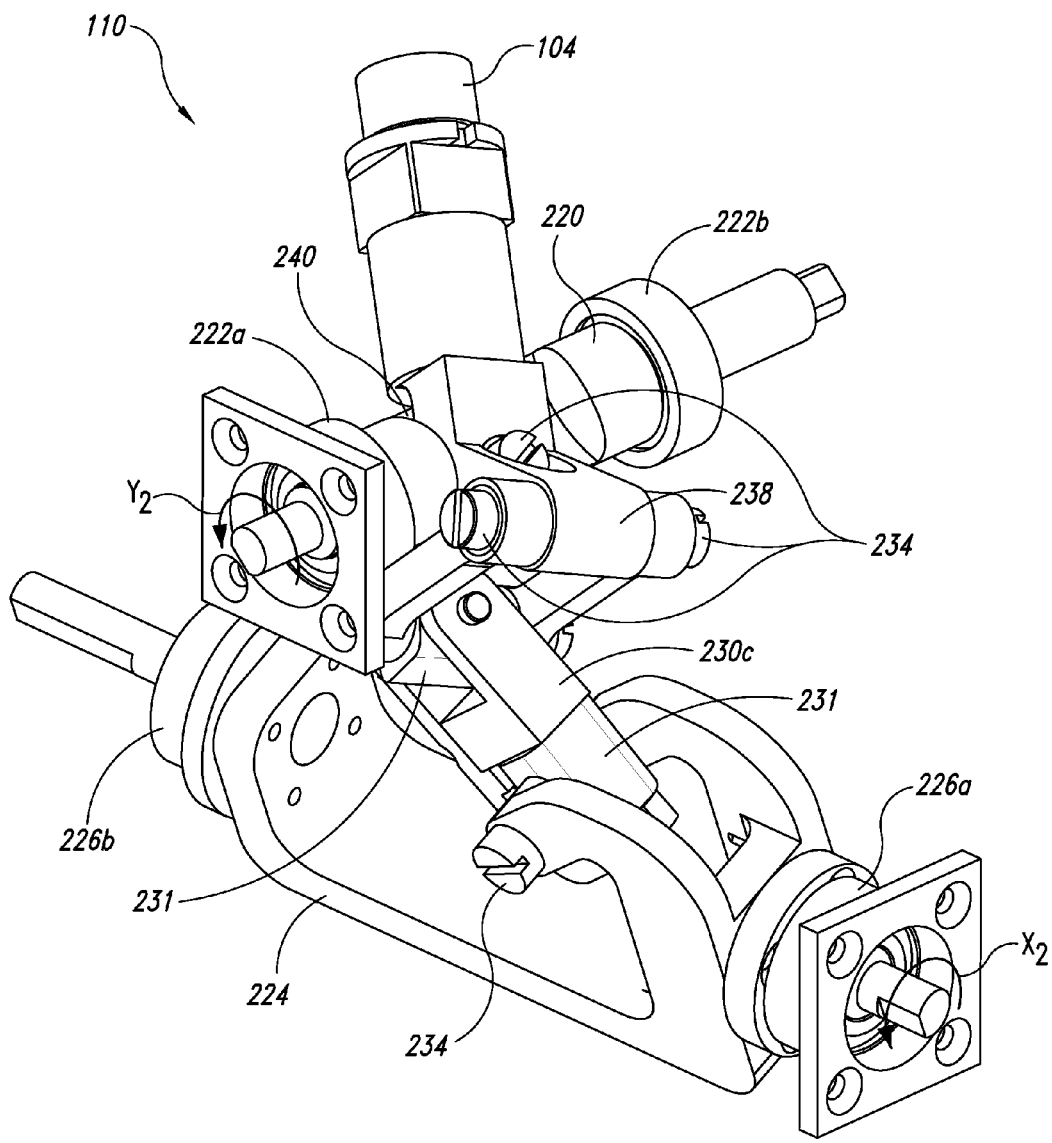
Figure 4A:
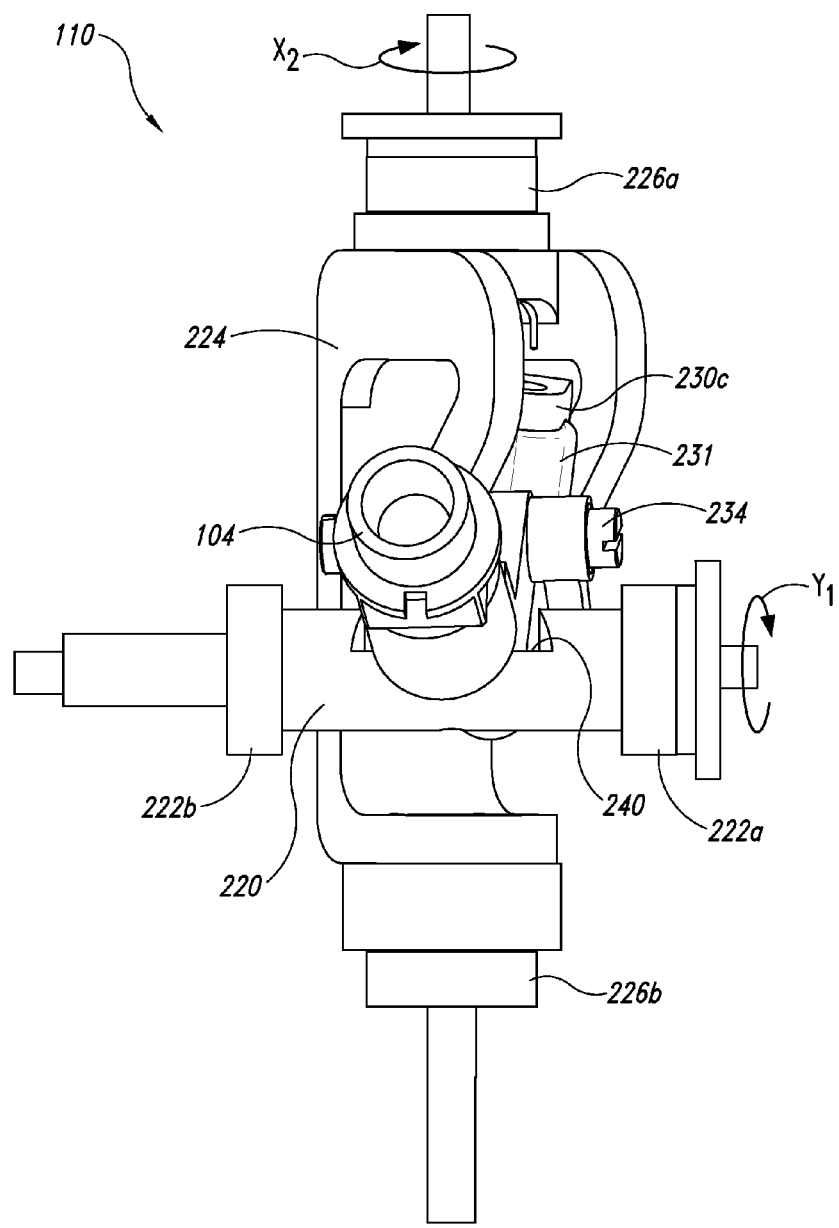
FIGS. 4A-4C are top views illustrating various orientations of the multi-axis pivot assembly of FIGS. 2A-2C corresponding to control inputs.
Figure 4B:
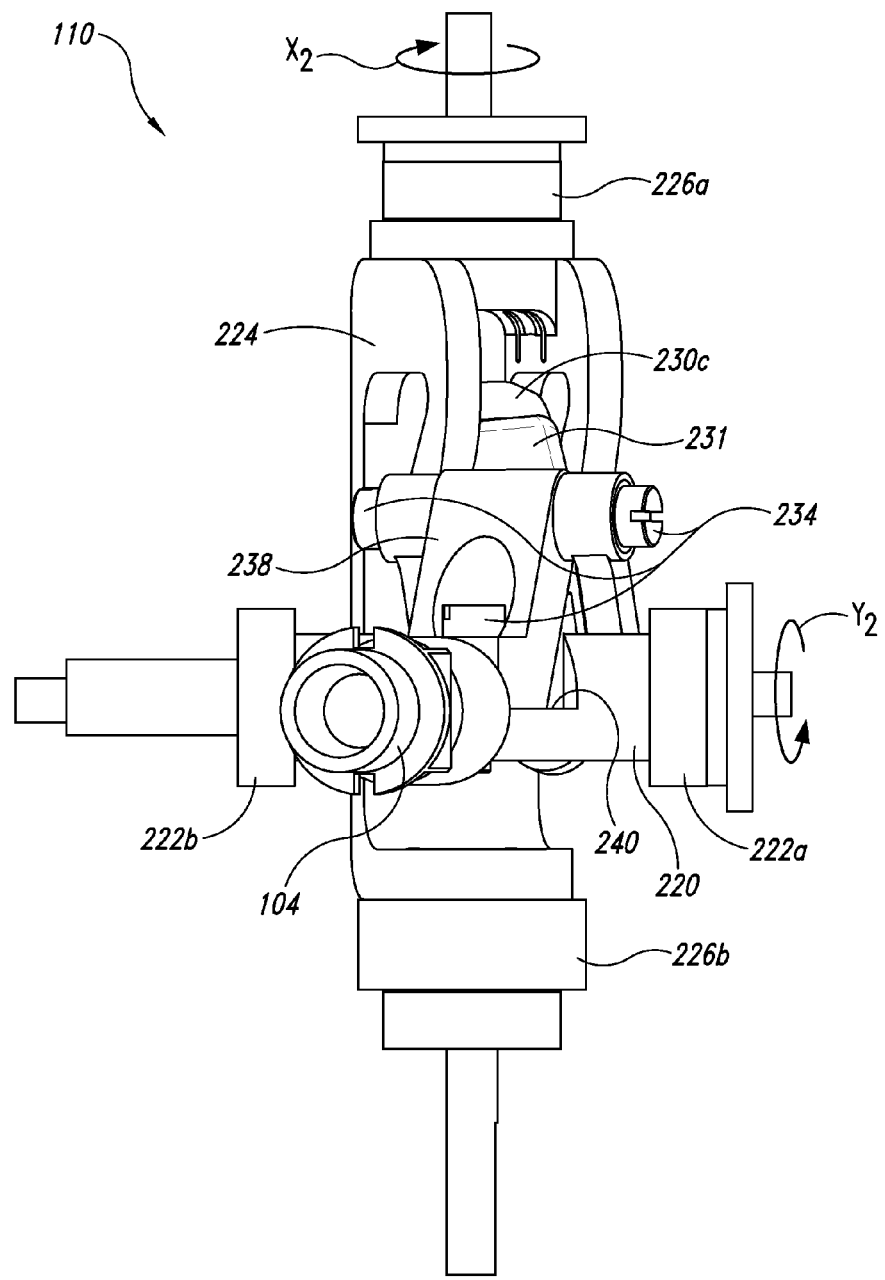
Figure 4C:
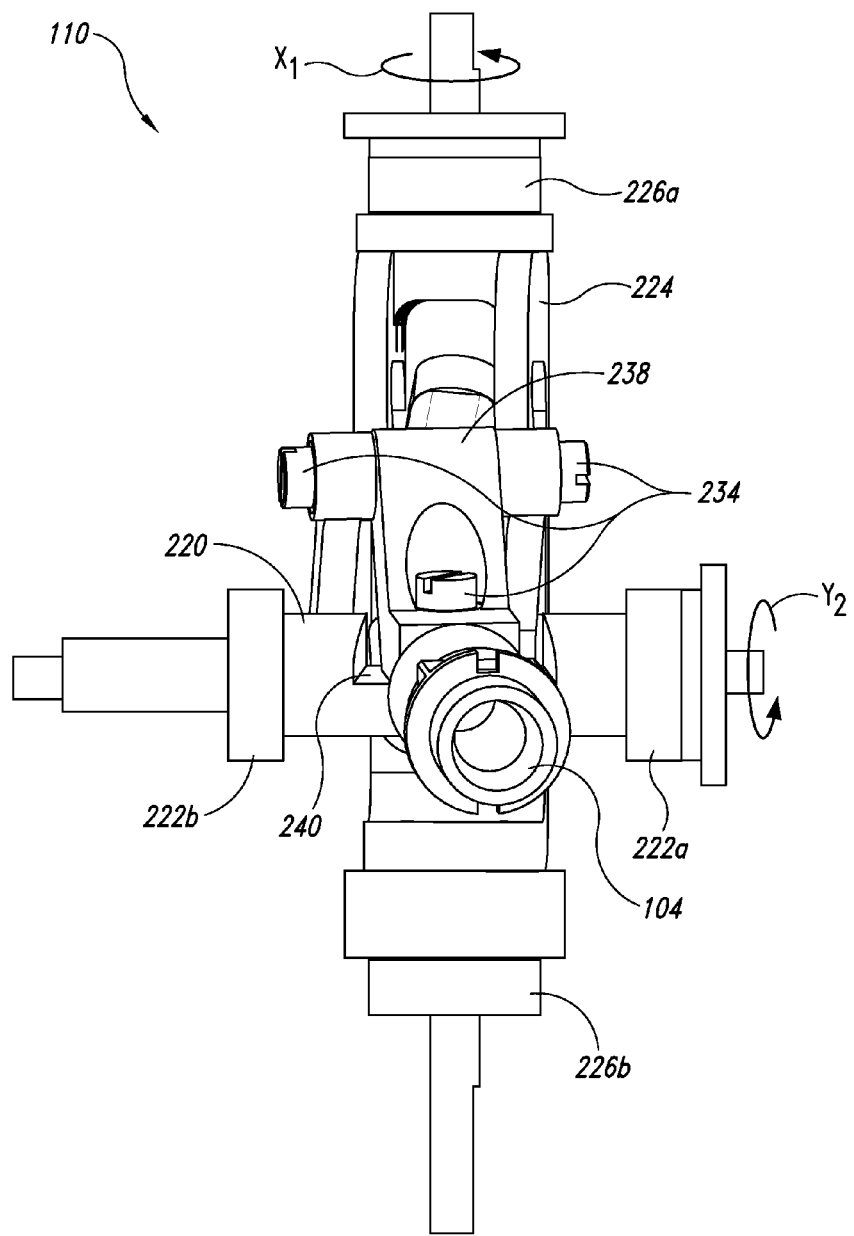

FIGS. 3A-3C are isometric views and FIGS. 4A-4C are top views illustrating various orientations of the pivot assembly of FIGS. 2A-2C corresponding to control inputs in accordance with an embodiment of the present technology. For the purposes of FIGS. 3A-4C, the terms "forward," "aft," "left," and "right" refer to the orientation of features relative to an operator positioned in the page rearward of the pivot assembly 110. In FIG. 3A, the input shaft 104 is illustrated as having received a control input that tilts the input shaft 104 sideways along the X axis (i.e., to the right) with substantially no movement along the Y axis. In response, the shaft grip 238 pivots about the pivoting joint 234 at the notched portion 240 of the Y axis output shaft 220. The linkages 230 rotate accordingly about pivoting joints 234 and twist about the spider pivot bolts 231 to rotate the X axis output shaft 224 in a first X output direction $X_1$ and thereby precisely moving the corresponding X axis output. The rotation of the Y axis output shaft 220 remains unchanged because the control input lacked any forward or aft movement corresponding to a Y input. The purely pivoting joints (i.e., pivoting joints 234) substantially remove the backlash from the pivot assembly 110 and thereby improve the sensitivity and accuracy of the pivot assembly outputs.

As shown in FIG. 3B, tilting the input shaft 104 forward and sideways to the left causes the shaft grip 238 to press against and rotate the Y axis output shaft 220 in a first Y direction $Y_1$ to pick up the corresponding Y output. Similar to the right sideways movement described in FIG. 3A, the left sideways movement of the input shaft 104 pivots the shaft grip 238 about the pivoting joint 234 such that the linkages 230 rotate the X axis output shaft 224 in a second X direction $X_2$ corresponding to the X axis output. As discussed above with reference to FIGS. 2A-2C, the linkages 230 can decouple the X axis output from the Y axis output such that they are substantially independent of one another.

In the embodiment illustrated in FIG. 3C, the control input moves the input shaft 104 aft along the Y axis and thereby presses the shaft grip 238 against the notched portion 240 to rotate the Y axis output shaft 220 in a second Y direction $Y_2$ corresponding to the Y axis output. The control input also moves the input shaft 104 to the left along the X axis such that the linkages 230 transmit the X axis output to the X axis output shaft 224 and rotate it a corresponding degree in the second X direction $X_2$.

FIG. 4A illustrates the pivot assembly 110 as control input moves the input shaft 104 forward and to the left causing the Y axis output shaft 220 to rotate in the first $Y_1$ direction Y and the X axis output shaft 224 to rotate in the second X direction $X_2$. As the control input changes and moves the input shaft 104 backward along the Y axis (FIG. 4B), the Y axis output shaft 220 reverses direction and rotates in the second Y direction $Y_2$. As the input shaft 104 is moved from the left to the right (FIG. 4C), the X axis output shaft 224 reverses direction and rotates in the first X direction $X_1$. The pivoting joints 234 prevent the backlash typically caused by reversing the X axis output shaft 224 and thereby accurately pick up the X axis output.

As discussed above, in other embodiments, the movement of the pivot mechanism 110 described in FIGS. 3A-4C can be reversed such that the Y and X axis output shafts 220 and 224 receive inputs (e.g., via a controller) that pivot the input shaft 104 into corresponding positions.

Figure 5A:
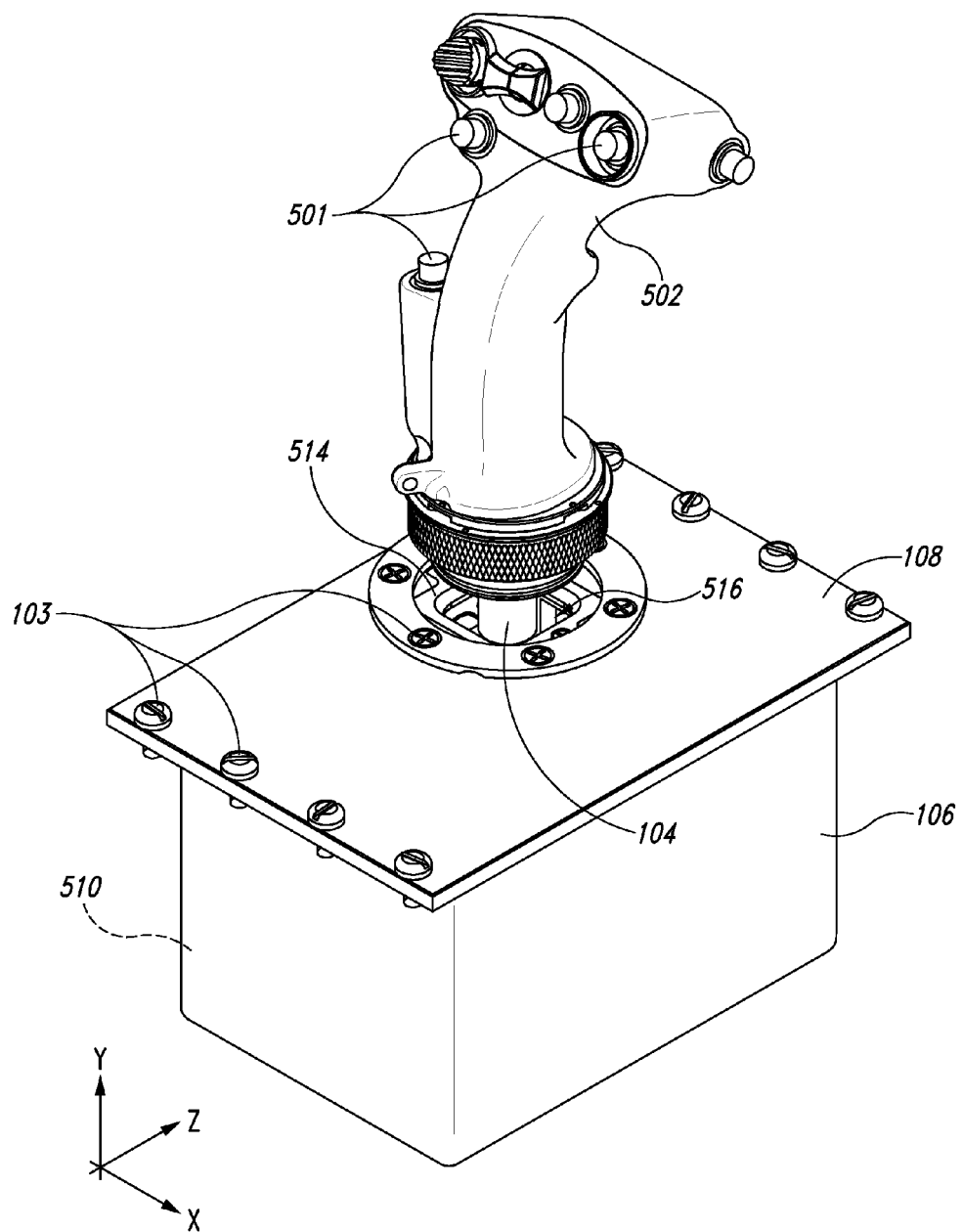
FIGS. 5A and 5B are isometric views of a control stick system configured in accordance with another embodiment of the present technology.
Figure 5B:
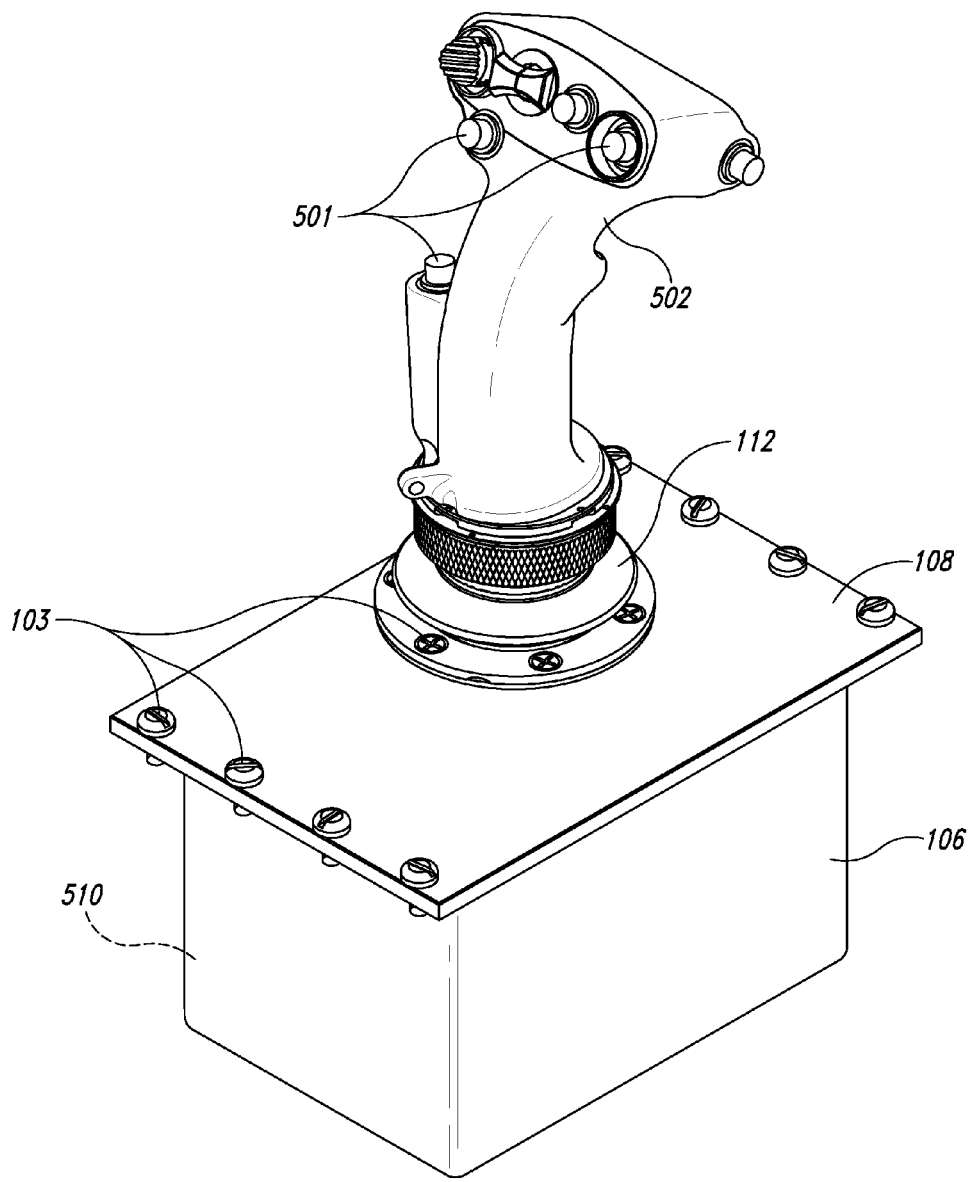

FIGS. 5A and 5B are isometric views of a control stick system 500 configured in accordance with another embodiment of the present technology. The control stick system 500 can include features generally similar to the control stick system 100 described above with reference to FIGS. 1A and 1B. For example, referring to FIGS. 5A and 5B together, the control stick system 500 can include the housing 106 enclosing a multi-axis pivot assembly 510 ("pivot assembly 510") and a boot 112 (FIG. 5B) that covers the input shaft 104 without substantially restricting its motion. As shown in FIG. 5A, the input shaft 104 (FIG. 5A) can extend up into a grip 502 and down through a stop ring 514 where it is coupled to the pivot assembly 510. Unlike the circular stop ring 114 of FIG. 1A, the stop ring 514 illustrated in FIG. 5A includes a square opening 516 that defines the range of motion of the input shaft 104. The corners of the square opening 116 can be used as contact points into which an operator can drive the input shaft 104. In other embodiments, the opening 116 can be circular as in FIG. 1A, oval, rectangular, and/or have another suitable shape. Additionally, as shown in FIGS. 5A and 5B, the grip 502 can include control buttons 501 that provide additional device or actuation controls.

Figure 6A:
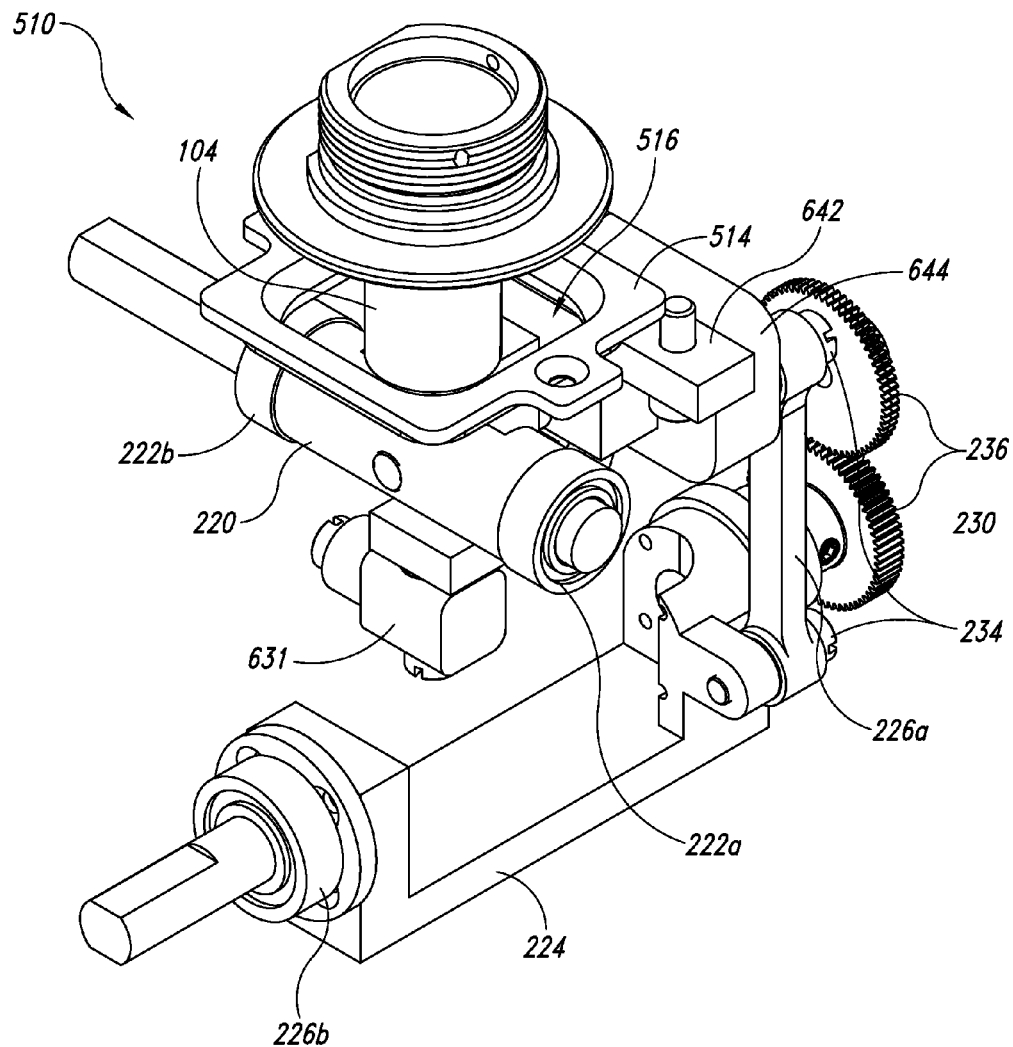
FIGS. 6A-6C are isometric and side views, respectively, of a multi-axis pivot assembly in accordance with another embodiment of the present technology.
Figure 6B:
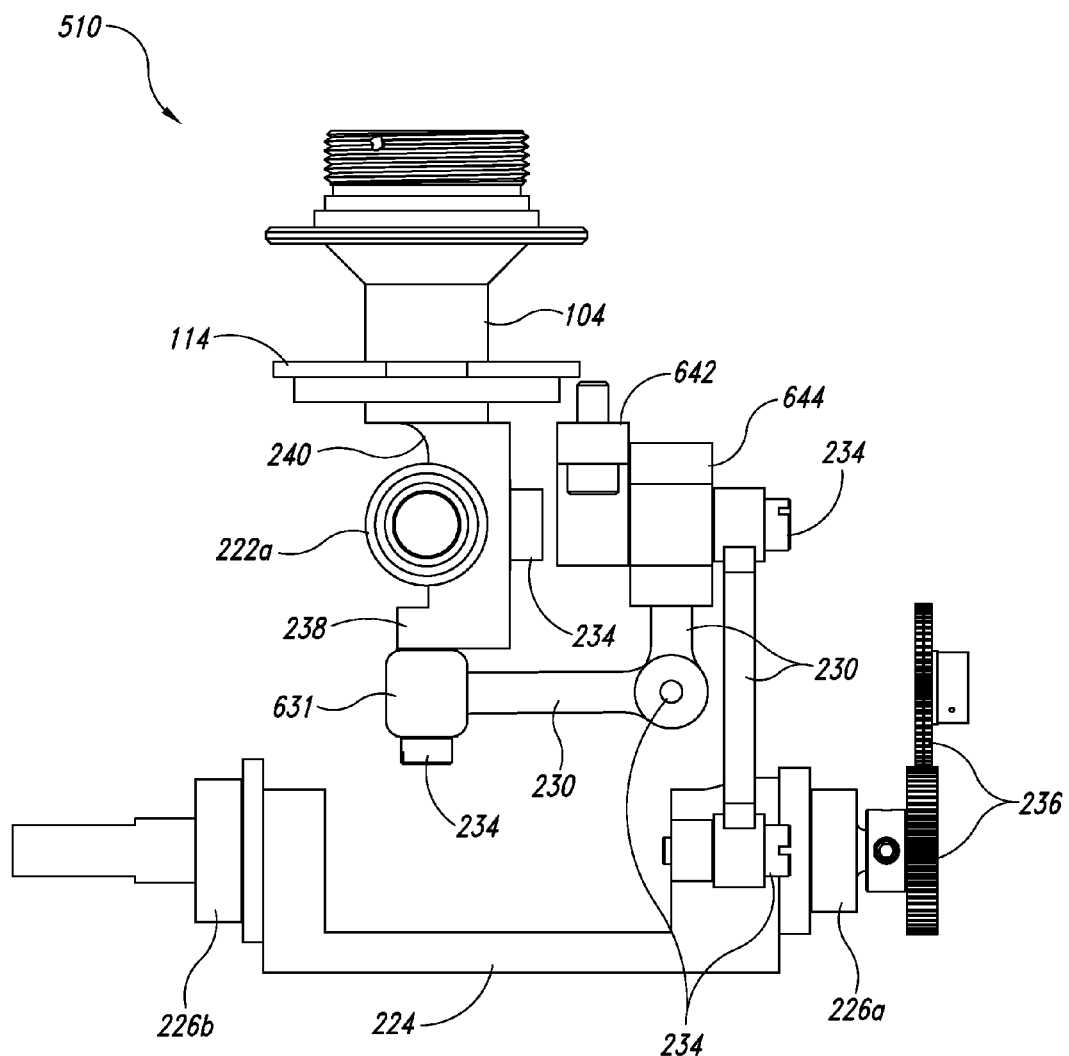
Figure 6C:
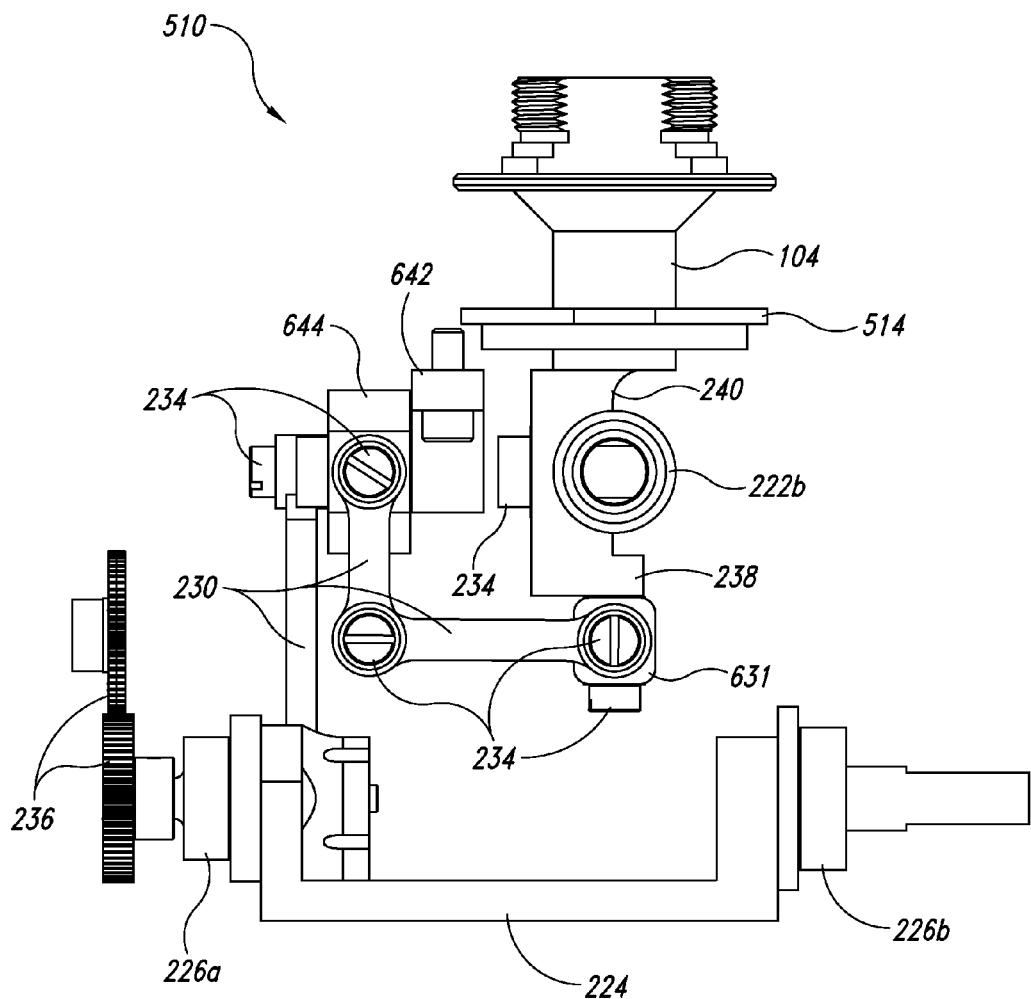

FIGS. 6A-6C are isometric, right side, and left side views, respectively, of the pivot assembly 510 configured in accordance with an embodiment of the present technology. The pivot assembly 510 can include generally similar features as the pivot assembly 110 described above with reference to FIGS. 2A-4C. For example, as shown in FIGS. 6A-6C, the pivot assembly 510 can include the shaft 104 coupled to the Y axis output shaft 220 and the X axis output shaft 224 such that the Y and X output shafts can pick up the corresponding Y and X axis outputs as the input shaft 104 pivots about the stop plate 514. The X axis output can be decoupled from the Y axis output through a series of pivoting linkages 230 that space the X output shaft 224 apart from the Y axis output shaft 220. The linkages 230 and the Y and X axis output shafts 220 and 224 can be coupled together with the pivoting joints 234 that substantially reduce the backlash in the control stick system 500. Additionally, the pivot assembly 510 can include a spider pivot bolt 631 that provides biaxial pivoting motion and thereby allows the linkages 230 to twist about one another.

In the embodiment illustrated in FIGS. 6A-6C, the X axis output has been relocated to an intermediate X axis output member 644. As shown in FIGS. 6B and 6C, the intermediate X axis member can be rotatably coupled to a stationary bracket 642 via the pivoting joint 234 (e.g., a shoulder screw riding on ball bearings). In other embodiments, the intermediate X axis output member 644 can be rotatably coupled to a plated or other stationary structure fixed in position relative to the first and second bearing sets 222 and 226. The intermediate X axis output member 644 can pick up the X axis output and transfer it to the X axis output shaft 224 via the pivoting linkage 230. The X axis output shaft 224 then rotates a direction and degree corresponding to the X axis output. Therefore, the intermediate X axis output member does not change the X axis output of the pivot assembly 510, but merely introduces a second pick up point for the X axis output. Accordingly, the intermediate X axis member 644 can be used to relocate the X axis output for particular pivot assembly configurations or constraints. Thus, similar to the pivot assembly 110 described above, the pivot assembly 510 has substantially reduced backlash.

From the foregoing, it will be appreciated that specific embodiments of the technology have been described herein for purposes of illustration, but that various modifications may be made without deviating from the spirit and scope of the technology. For example, the pivoting joints described in the Figures above are bearings. However, in other embodiments, the pivoting joints can include other mechanisms or structures that allow the linkages to pivot relative to one another. Certain aspects of the new technology described in the context of particular embodiments may be combined or eliminated in other embodiments. For example, the pivot assembly 510 described above in FIGS. 6A-6C can be used with the control stick system 100 described in FIGS. 1A and 1B, and the pivot assembly 110 shown in FIGS. 2A-2C can be used with the control stick system 500 described in FIGS. 5A and 5B. Additionally, while advantages associated with certain embodiments of the new technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:
1. A multi-axis control stick assembly, comprising:
an input shaft;
a first axis output shaft operably coupled to the input shaft, the first axis output shaft being rotatable about first fixed bearings as the input shaft moves with a component of motion along a first axis, wherein the rotation of the first axis output shaft is configured to capture a first axis output;
a second axis output shaft rotatable about second fixed bearings as the input shaft moves with a component of motion along a second axis orthogonal to the first axis, wherein the first and second fixed bearings are in fixed axial positions relative to each other during movement of the input shaft and rotation of the first or second axis output shafts, and wherein the rotation of the second axis output shaft is configured to capture a second axis output; and
a series of linkages coupled to the first axis output shaft and the second axis output shaft via a plurality of pivoting joints, wherein the series of linkages are configured to decouple first axis movement of the input shaft from second axis movement of the input shaft such that the second axis output is substantially independent of the first axis output.

2. The assembly of claim 1, further comprises:
a first axis sensor coupled to the first axis output shaft, wherein the first axis sensor is configured to sense the first axis output; and
a second axis sensor coupled to the second axis output shaft, wherein the second axis sensor is configured to sense the second axis output.

3. A multi-axis control stick assembly, comprising:
an input shaft;
a first axis output shaft operably coupled to the input shaft, the first axis output shaft being rotatable about first fixed bearings as the input shaft moves with a component of motion along a first axis, wherein the rotation of the first axis output shaft is configured to capture a first axis output;
a second axis output shaft rotatable about second fixed bearings as the input shaft moves with a component of motion along a second axis orthogonal to the first axis, wherein the rotation of the second axis output shaft is configured to capture a second axis output;
a series of linkages coupled to the first axis output shaft and the second axis output shaft via a plurality of pivoting joints, wherein the series of linkages are configured to decouple first axis movement of the input shaft from second axis movement of the input shaft such that the second axis output is substantially independent of the first axis output; and
a stop ring having an opening, wherein the input shaft extends through the opening.

4. The assembly of claim 1 wherein the pivoting joints include a plurality of bearings, and wherein the plurality of bearings are biased to reduce backlash.

5. The assembly of claim 1 wherein:
the first axis output shaft is configured to translate fore and aft movement of the input shaft into the first axis output; and
the second axis output shaft is configured to translate sideways movement of the input shaft into the second axis output.

6. The assembly of claim 1 wherein the input shaft is a control stick configured to control aircraft pitch and aircraft roll.

7. The assembly of claim 1 further comprising an intermediate output member coupled between the first axis output shaft and the second axis output shaft, wherein the intermediate output member is fixed relative to the first and second fixed bearings and configured to transmit the second axis output to the second axis output shaft.

8. The control stick system of claim 1 wherein the second axis output shaft is configured to have no more than approximately 2° of backlash.

9. A multi-axis pivot system, comprising:
an input shaft;
a first axis output shaft coupled to the input shaft;
a first bearing set coupled to the first axis output shaft, wherein the first axis output shaft is configured to rotate about the first bearing set when the input shaft moves with motion having a component along a first axis;
a second axis output shaft coupled to the input shaft via a series of linkages;
a second bearing set supporting the second axis output shaft, the first and second bearing sets being fixed in position relative to one another, wherein the second axis output shaft is configured to rotate about the second bearing set when the input shaft moves with motion having a component along a second axis orthogonal to the first axis, and wherein movement of the first axis output is independent of movement of the second axis output shaft; and
a plurality of pivoting joints coupling together the first axis output shaft, the second axis output shaft, and the series of linkages.

10. The system of claim 9, further comprising a biaxially pivoting joint coupled between the first axis output shaft and the second axis output shaft, wherein the biaxially pivoting joint is configured to twist between the first axis output shaft and the second axis output shaft.

11. The system of claim 9, further comprising a stop ring having at least one of a generally circular opening and a generally square opening, wherein the input shaft extends through the opening.

12. The system of claim 9 wherein the pivoting joints each comprise a shoulder screw rotatably coupled to a bearing set.

13. The system of claim 9, wherein:
the first axis output shaft is configured to control aircraft pitch; and
the second axis output shaft is configured to control aircraft roll.

14. The system of claim 9, wherein the first axis output shaft is a Y-axis output shaft, and the second axis output shaft is an X axis output shaft.

15. The system of claim 9 wherein:
the first bearing set comprises a first ball bearing coupled to a first end portion of the first axis output shaft and a second ball bearing coupled to a second end portion of the first axis output shaft, the first and second ball bearings having an inner portion proximate to the first axis output shaft and an outer portion spaced radially outward from the inner portion, the inner portions being biased toward one another, and the outer portions being biased away from one another; and
the second bearing set comprises a third ball bearing coupled to a first end portion of the second axis output shaft and a fourth ball bearing coupled to a second end portion of the second axis output shaft, the third and fourth ball bearings having an inner portion proximate to the second axis output shaft and an outer portion spaced radially outward from the inner portion, the inner portions being biased toward one another, and the outer portions being biased away from one another.

16. The system of claim 9 wherein:
the first axis output shaft is configured to receive a first axis input;
the second axis output shaft is configured to receive a second axis input; and
the input shaft is configured as an output shaft having an output that is a combination of the first axis input and the second axis input.

17. The system of claim 9, further comprising:
a grip coupled to the input shaft;
a stop ring having an opening, wherein the input shaft extends through the opening;
a first interface member coupled to the first axis output shaft, the first interface member being configured to drive a first axis sensor;
a biaxially pivoting joint configured to twist between the first axis output shaft and the second axis output shaft; and
a second interface member coupled to the second axis output shaft, the second interface member being configured to drive a second axis sensor.

18. The system of claim 9, further comprising an intermediate axis output member coupled between the first axis output shaft and the second axis output shaft via the plurality of linkages.

19. A multi-axis pivot system, comprising:
    an input shaft;
    a first axis output shaft coupled to the input shaft;
    a first bearing set coupled to the first axis output shaft, wherein the first axis output shaft is rotatable about the first bearing set when the input shaft moves with motion having a component along a first axis;
    a second axis output shaft coupled to the input shaft via a series of linkages;
    a second bearing set supporting the second axis output shaft, the first and second bearing sets being fixed in position relative to one another, wherein the second axis output shaft is rotatable about the second bearing set when the input shaft moves with motion having a component along a second axis orthogonal to the first axis, and wherein movement of the first axis output is independent of movement of the second axis output shaft; and
    a plurality of pivoting joints coupling together the first axis output shaft, the second axis output shaft, and the series of linkages;
    wherein the first bearing set has a first bearing coupled to a first end portion of the first axis output shaft and a second bearing coupled to a second end portion of the first axis output shaft, the first and second bearings having an inner portion proximate to the first axis output shaft and an outer portion spaced radially outward from the inner portion, the inner portions being biased toward one another, and the outer portions being biased away from one another; and
    the second bearing set has a third bearing coupled to a first end portion of the second axis output shaft and a fourth bearing coupled to a second end portion of the second axis output shaft, the third and fourth bearings having an inner portion proximate to the second axis output shaft and an outer portion spaced radially outward from the inner portion, the inner portions being biased toward one another, and the outer portions being biased away from one another.

\* \* \* \* \*